United States Patent [19]

Gold

[11] Patent Number: 4,638,598
[45] Date of Patent: Jan. 27, 1987

[54] FORCE HINGE CONNECTION FOR THE LATCHING MECHANISM OF A PANEL TRUCK OR VAN WINDOW

[76] Inventor: Peter N. Gold, 465 North Wood Rd., Rockville Centre, N.Y. 11570

[21] Appl. No.: 858,711

[22] Filed: May 2, 1986

[51] Int. Cl.[4] .............................................. E05B 65/06
[52] U.S. Cl. ...................................... 49/394; 292/262
[58] Field of Search ................. 49/394, 276, 356, 381; 292/263, DIG. 49, DIG. 73, 262

[56] References Cited

U.S. PATENT DOCUMENTS

| | | | |
|---|---|---|---|
| 1,301,975 | 4/1919 | Root | 49/356 X |
| 1,725,419 | 8/1929 | Raymond | 292/263 X |
| 2,599,760 | 6/1952 | Hanson et al. | 49/356 X |
| 4,363,191 | 12/1982 | Morgan | 49/381 |

Primary Examiner—Kenneth Downey
Attorney, Agent, or Firm—Bauer & Amer

[57] ABSTRACT

A window pane is hung along one edge of a window frame by a flexure mechanism arranged to permit pivotal movement of the pane about an axis oriented along the corresponding edge of the frame. An over centered handle latch is mounted on the lower edge of the frame and is operable to move the window pane between an open and closed position. A resilient hinge connects the handle latch directly to the pane so as to enable the handle latch and pane to have relative elastic movement during movement into and also in both the closed and open condition.

4 Claims, 6 Drawing Figures

FORCE HINGE CONNECTION FOR THE LATCHING MECHANISM OF A PANEL TRUCK OR VAN WINDOW

BACKGROUND OF THE INVENTION

The present invention relates to casement-type window constructions for panel trucks, vans and the like, and in particular to an improvement in the hinge connection for a handle latch therefor.

In the co-pending application Ser. No. 764,331 filed Aug. 12, 1985, entitled "CASEMENT WINDOW FOR PANEL TRUCKS AND VANS", applicant discloses a casement window construction comprising a rectangular window frame in which a window pane is arranged for restricted pivotal movement about an axis oriented along its upper edge. This earlier application provided an improved connecting pivot mechanism, but relied upon a conventional latch mechanism for manipulating and maintaining the window pane in its closed and open positions.

Such a conventional latch mechanism is shown also in U.S. Pat. No. 4,363,191 issued Dec. 14, 1982 to Cleon C. MORGAN. The mechanism comprises a toggle or over-centered articulated handle attached to the frame and to the window along its lower edge. The latch is connected to the window by a threaded stud passing through a hole in the pane itself, the stud being held tightly by one or more nuts. This type of connection has several disadvantages, the most important of which is that any warping of the window or displacement of the lock can easily result in breaking the pane itself. Another disadvantage lies in the fact that since the locking and open position of the latch remains fixed at all times, any deterioration of the interposed weather stripping cannot be compensated for.

It is the object of the present invention to provide an improved latch for pivotally hanging casement windows of a van or panel truck type which overcomes the disadvantages of the prior art.

It is another object of the present invention to provide an over-centered latch which is resiliently connected to the window pane to reduce to an absolute minimum the possibility of breakage and to provide a more resilient opening and closure.

It is a further object to provide an improved latch which is simple to install and which has a long-lasting life.

These objects together with other objects and numerous advantages will be obvious from the following disclosure of the present invention.

SUMMARY OF THE INVENTION

According to the present invention, a casement window for a panel truck, van, or the like which is hung along one edge by flexure mechanism arranged to permit restricted pivotal movement of the window about an axis oriented along the corresponding edge of the window frame, is provided with an over centered latch and a resilient hinge connecting the latch directly to the window pane itself enabling the latch and window to have relative elastic movement during manipulation and in both the closed and open positions.

In this manner, slight movement or distortion of either the window or the latch can be made without causing breakage of the pane. In addition, the resilient connection provided by the resilient hinge allows compensation for variance in the weather stripping between frame and window pane and in addition holds the window pane taut in either closed, open or partially open condition, while permitting absorbtion of jolts or shocks. More particularly, and as will be apparent as the description proceeds, in the closed position, the spring or resilient connection keeps a constant inward force on the glass and thus holds it against the strip seal of the window and thus helps to prevent chattering, while in the open position it cushions shocks and jolts that might otherwise damage the glass.

The resilient hinge is preferably formed by serpentine band of relatively rigid metal bent permanently into a body having two distinct U-shaped sections, one of which is adapted to envelop the edge of the window pane and to be adhesively secured thereto, while the other section comprises a compressible spring the free end of which is attached to the handle latch. Preferably, the free end is coiled in an inward spiral to provide additional compressive biasing.

Full details of the present invention are contained in the following disclosure of the preferred embodiment of the invention, and are illustrated in the accompanying drawings.

DESCRIPTION OF THE INVENTION

Figure 1:
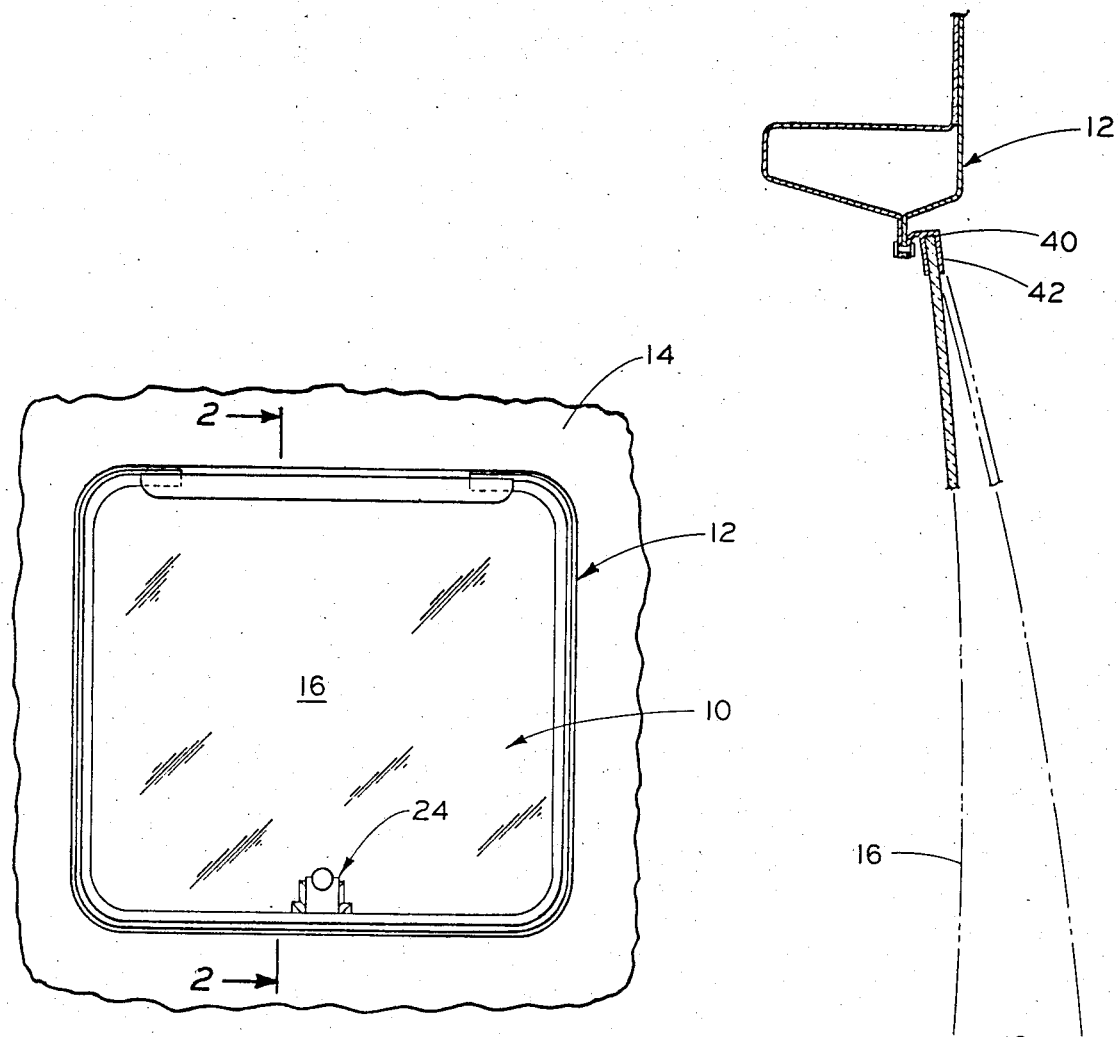
FIG. 1 is a front elevational view of a conventional van window showing its mounting with a prior art latch.
Figure 2:
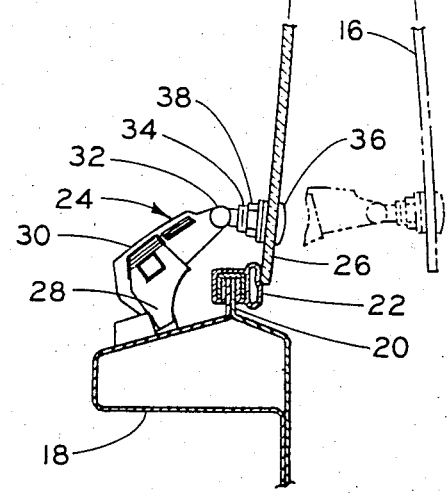
FIG. 2 is a sectional view taken along line 2—2 of FIG. 1.

The present invention is applied to a more or less conventional window of the type disclosed in applicant's aforementioned patent as illustrated briefly in FIGS. 1 and 2. The window, generally depicted by the numeral 10 comprises a frame 12 formed in the wall panel 14 of a truck or van, shown only in part in the drawings. The window includes a bowed or complexedly curved pane 16 of glass or plastic which may or may not have a peripheral protective border.

Figure 3:
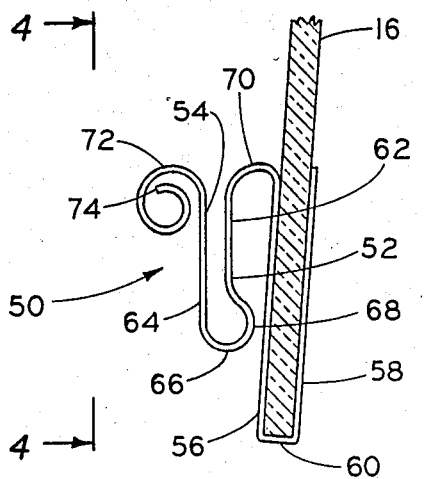
FIG. 3 is an enlarged sectional view of the resilient hinge of the present invention, separated from the latch.
Figure 4:
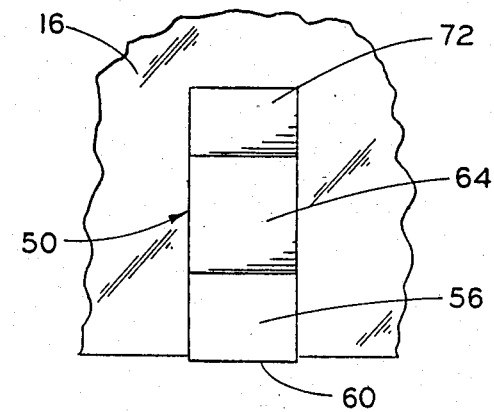
FIG. 4 is a front elevational view of the resilient hinge taken in the direction of lines 4—4.

As seen in the cross section of FIGS. 2 and 3, the frame 12 is formed by enlarging the sheet metal material forming the wall panel 14 to provide a more or less rectangularly cross-sectioned sill 18. The sill 18 is provided with an interior flange or bezel 20 over which an elastomeric weather stripping 22 is secured. The weather stripping 22 serves to abut against the peripheral edge of the window pane 16 and is compressed when the window is closed in order to provide an air and water tight seal completely between pane 16 and frame 12.

A conventional handle latch 24 of the type also shown in MORGAN U.S. Pat. No. 4,363,191, was employed being attached to the sill 18 and window pane 16 along the lower edge thereof. The latch 24 connects the lower free edge 26 of the window pane with the sill 18 so as to enable manual control of the pivotal motion of the window. The latch 24 includes a base 28 on which is pivotally mounted a handle 30 so as to generally move up and forwardly in the direction of arrow A (FIG. 6) to open the window, and rearwardly and downwardly in the direction of arrow B (FIG. 5) to close the window. In particular, the pivot arrangement 30 of the handle is such that in each direction, the handle passes over the center position so that it positively latches in the open or closed conditions. The handle 30 is provided with a nose 32 which is connected by a stud 34 directly to the window pane 16. Stud 34 extends through a mating aperture in the pane, and includes an enlarged head 36 and a nut 38 positioned on opposite sides of the glass. The latch 24 has a locked position which is illustrated by the full lines of FIG. 2, wherein window pane 16 is fully pivoted inwardly against weather stripping 22, and an unlocked position by which it is extended outwardly to pivot window pane to a normally fully open position, as illustrated by the broken lines in FIG. 2, which, of course, in installation is limited to prevent the window pane from extending too far from the body of the vehicle.

The window pane 16 is fastened along its upper edge 40 by a pivot mechanism 42 shown in the aforementioned application so as to swing between the closed and open conditions shown. The connecting pivot mechanism 42 is made of metal such as steel or aluminum, or of plastic such as high impact resistance plastic which is rigid in form, but which is formable to provide sufficient springiness and flexure. Actually, the bent pivot mechanism is not intended to flex about a single line or axis, but to move by slight deformation and bending when the window is swung. In this manner, the connecting mechanism may be said to flex, swing or pivot about its own axis, although neither is actually done.

In so far as disclosed herein, the construction of the window and its operation is of a conventional nature. Further details of such construction need not be made herein as reference to the aforementioned patents or to the numerously commercially available casement type windows for panel trucks and vans are freely available. According to the present invention a resilient hinge is provided to replace the stud connection, conventional as seen, so as to avoid the disadvantages herein enumerated therefor.

Figure 5:
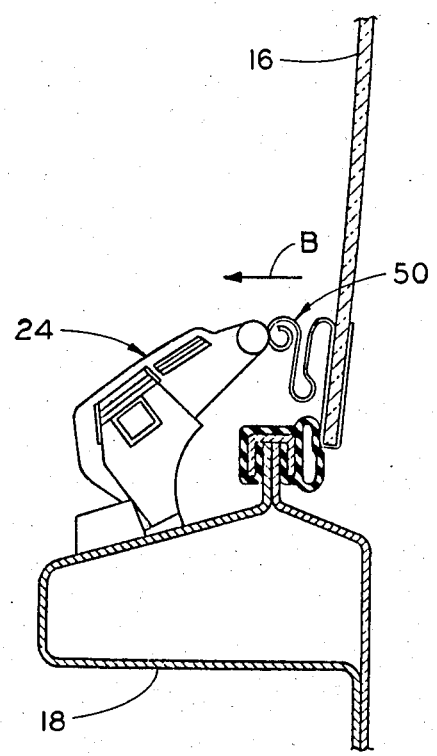
FIG. 5 is a side-elevational view partially sectioned of a van window employing the resilient hinge of the present invention.
Figure 6:
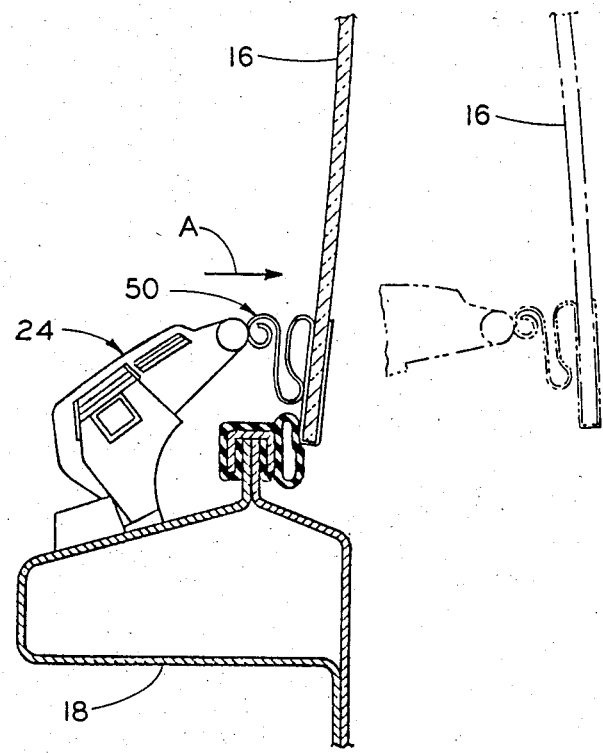
FIG. 6 is a view similar to that of FIG. 5 showing the window in the opening and open positions.

Turning to FIGS. 3-6 the resilient hinge of the present invention generally depicted by the numeral 50 comprises a unitary or one piece serpentine band of metal, preferably of spring grade, bent to form a pair of sections generally depicted by numerals 52 and 54, each having U-shaped cross section. The first U-shaped section 52 comprises a pair of parallel straight legs 56 and 58 connected by a perpendicular bight 60 of a width slightly smaller than that of the thickness of the window pane 16. The legs 56 and 58 are force fit over the lower edge of the window pane 16 and adhesively secured thereto using conventional metal to glass adhesives. The second U-shaped section 54 comprises a pair of convoluted legs 62 and 64, joined by an arcuate bight 66 which also has a bowing portion 68 facing the window pane 16. The two adjacent U-shaped sections 52 and 54, respectively, are joined by an accurate web 70 which causes the leg 64 of the second U-shaped section 54 to bend slightly toward the window pane 16. The free end of the outer leg 62 of the second U-shaped section 54 is bent to form a coil 72 in an inward spiral so that its terminal end 74 lies in the interior of the coil, and the coil has at least one turn. The coil 72 is secured by welding or by a screw fastener to the nose 32 of the handle latch, as seen in FIGS. 5 & 6.

As seen in FIG. 5, when the handle latch 30 is retracted to close the window, the window pane 16 seats against the weather strip 22 and the second U-shaped section 54 of the resilient hinge 50 assumes a relaxed position wherein the loop is open and the bowed portion 68 is spaced from the window pane 16. In FIG. 6, the window is shown in solid lines and is in the initial stage of being opened. In this situation, the handle latch 30 is moved from its locked condition and starts its traverse forwardly in the direction of arrow A, toward the window pane 16, compressing the resilient hinge 50 so that the bowed portion 68 touches the window pane 16, (actually flat leg 56 of the first U-shaped section which is adhered to the window pane) without actually moving the window at all. It is only after the handle latch 30 is further moved in direction of arrow A beyond its over the center position that the window opens to assume the position shown in the phantom lines. In the open condition, the resilient hinge again assumes its relaxed postion.

As seen from the foregoing, the present invention eliminates the use of a fixed stud, passing through the window pane, and avoids the costly step of putting a hole in the glass or plastic. In addition, the resilient hinge is easily attached to the pane and has a resilient spring action applied along a rather wide area at the lower edge of the pane. The pane is thus held to the window more securely, as well as more resiliently. Thus, in the closed position, the window is securely sealed with the weather strip, while in the open position, the window is capable of absorbing minor shocks and jolts without cracking or breaking.

The foregoing description is illustrative of the present invention and various modifications and embodiments have been suggested and others will be readily available to those skilled in the art. Accordingly, it is intended that the present invention be limited only b.y the scope of the appendant claims.

What is claimed is:

1. A casement window for a panel truck, van or the like having a window pane hung along one edge of a window frame by a flexure mechanism arranged to permit pivotal movment of said window pane about an axis oriented along the corresponding edge of the window frame, an over centered handle latch mounted on said window frame and being operable to move said window pane between an open and closed position, and a resilient hinge connecting said latch directly to said window pane so as to enable said latch and pane to have relative elastic movement in both the closed and open condition, said resilient hinge comprising a serpentine band having a pair of interconnected U-shaped sections, one of which being adapted to envelop and be adhesively secured along the edge of said window pane, the other of which comprises a compressible spring the free end of which is secured to said latch.

2. The resilient hinge according to claim 1 wherein the free end of said other U-shaped section is bent inwardly to form a spiral coil having at least one turn, said coil being secured by its outer turn to said latch.

3. The resilient hinge according to claim 2 wherein said coil is welded to the nose of said latch.

4. The resilient hinge according to claim 3 formed of a single band of spring grade metal.

* * * * *